United States Patent
Szerenyi

(10) Patent No.: US 10,210,074 B1
(45) Date of Patent: Feb. 19, 2019

(54) PERFORMANCE TESTING PLATFORM THAT ENABLES REUSE OF AUTOMATION SCRIPTS AND PERFORMANCE TESTING SCALABILITY

(71) Applicant: Capital One Services, LLC, McLean, VA (US)

(72) Inventor: Laszlo Szerenyi, Chesterfield, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/002,823

(22) Filed: Jun. 7, 2018

(51) Int. Cl.
  *G06F 11/00* (2006.01)
  *G06F 11/36* (2006.01)
  *G06F 9/455* (2018.01)

(52) U.S. Cl.
  CPC ...... *G06F 11/3664* (2013.01); *G06F 11/3688* (2013.01); *G06F 9/45545* (2013.01)

(58) Field of Classification Search
  CPC ............. G06F 11/3664; G06F 11/3672; G06F 11/3688
  See application file for complete search history.

(56) References Cited

U.S. PATENT DOCUMENTS

| | | | | |
|---|---|---|---|---|
| 6,044,398 A | * | 3/2000 | Marullo | G06F 17/3089 703/20 |
| 9,767,009 B2 | * | 9/2017 | Cobb, Jr. | G06F 11/3688 |
| 2013/0054792 A1 | | 2/2013 | Sharaf | |
| 2014/0025812 A1 | * | 1/2014 | Schwarzbauer | G06F 11/36 709/224 |
| 2015/0106791 A1 | * | 4/2015 | Karuppiah | G06F 11/3688 717/127 |
| 2015/0304386 A1 | * | 10/2015 | Schwarzbauer | G06F 11/36 709/203 |
| 2016/0004628 A1 | * | 1/2016 | Gugri | G06F 11/3688 717/124 |
| 2016/0266921 A1 | * | 9/2016 | Mao | G06F 9/45558 |
| 2017/0091079 A1 | | 3/2017 | Zhou | |

* cited by examiner

*Primary Examiner* — Elmira Mehrmanesh
(74) *Attorney, Agent, or Firm* — Harrity & Harrity, LLP

(57) ABSTRACT

A testing platform receives a code for testing, where the code is to be tested using a browser. The testing platform determines a number of a plurality of browsers that are to be used to test the code and generates a number of a plurality of virtual machines to host the plurality of browsers, where the number of the plurality of virtual machines is based on the number of the plurality of browsers. The testing platform assigns an automation script to each virtual machine of the virtual machines to test the code, and monitors execution of the automation script by each virtual machine of the plurality of virtual machines. The testing platform performs an action associated with the execution of the automation script by each virtual machine of the plurality of virtual machines.

20 Claims, 6 Drawing Sheets

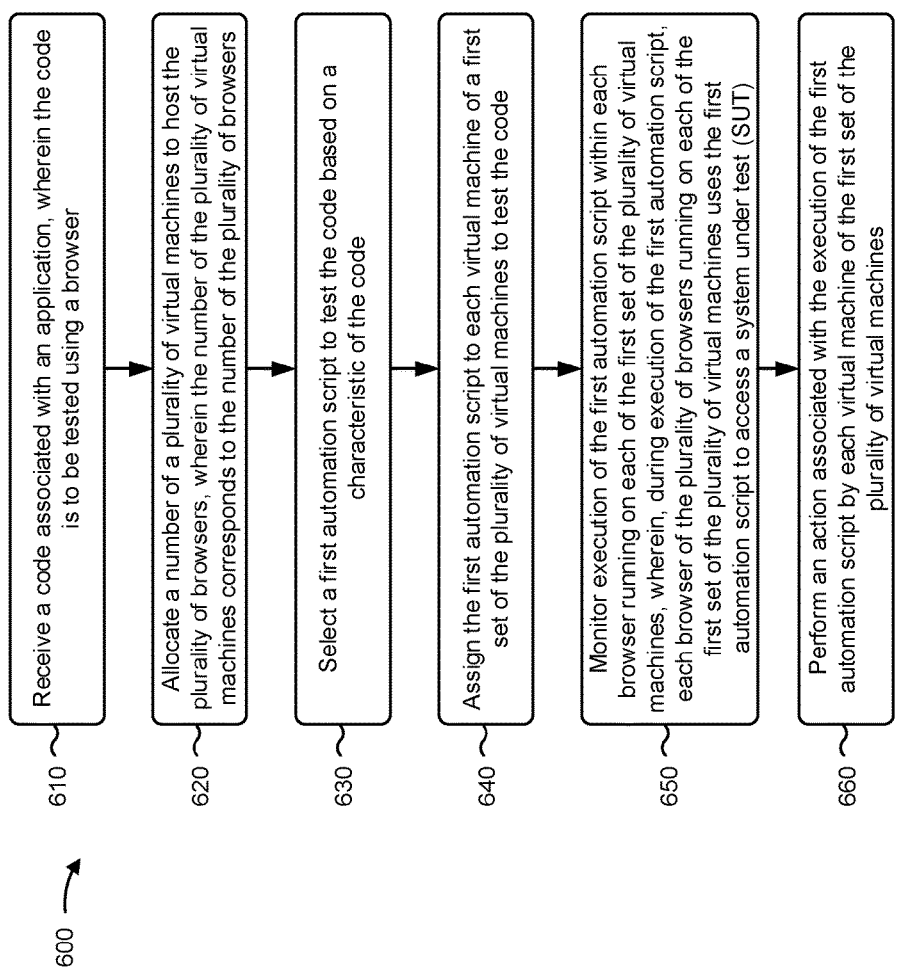

PERFORMANCE TESTING PLATFORM THAT ENABLES REUSE OF AUTOMATION SCRIPTS AND PERFORMANCE TESTING SCALABILITY

BACKGROUND

Performance testing of software and/or applications enables a user (e.g., a software developer, an application developer, and/or the like) to determine how a system under test performs in terms of responsiveness, stability under a particular load, scalability, reliability, and/or the like. Accordingly, performance testing can indicate and/or identify how updates or edits to the software and/or application may affect performance of software, the application, and/or hardware (e.g., devices implementing the software, devices in communication with devices implementing the software, network devices associated with the devices implementing the software, and/or the like) associated with the software or application.

SUMMARY

According to some implementations, a method may include receiving a code for testing, wherein the code is to be tested using a browser. The method may include determining a number of a plurality of browsers that are to be used to test the code and/or generating a number of a plurality of virtual machines to host the plurality of browsers, wherein the number of the plurality of virtual machines is based on the number of the plurality of browsers. The method may include assigning an automation script to each virtual machine of the virtual machines to test the code, and monitoring execution of the automation script by each virtual machine of the plurality of virtual machines. The method may include performing an action associated with the execution of the automation script by each virtual machine of the plurality of virtual machines.

According to some implementations, a device may include one or more memories, and one or more processors, communicatively coupled to the one or more memories, to receive a code associated with an application, wherein the code is to be tested using a browser. The one or more processors may determine a characteristic of the application and may select an automation script to test the code based on the characteristic of the code. The one or more processors may assign the automation script to each virtual machine of a plurality of virtual machines to test the code, wherein the automation script comprises a plurality of performance tests to test the code and the plurality of virtual machines to run a plurality of browsers, and wherein a number of the plurality of virtual machines corresponds to a number of the plurality of browsers and the number of the plurality of browsers is based on the characteristic of the application. The one or more processors may monitor execution of the automation script by each virtual machine of the plurality of virtual machines and may indicate when the code passes or fails one or more of the performance tests based on the execution of the automation script by each virtual machine of the plurality of virtual machines.

According to some implementations, a non-transitory computer-readable medium may store instructions that include one or more instructions that, when executed by one or more processors of a device, cause the one or more processors to receive a code associated with an application, wherein the code is to be tested using a browser. The one or more instructions may cause the one or more processors to allocate a number of a plurality of virtual machines to host a plurality of browsers, wherein the number of the plurality of virtual machines corresponds to a number of the plurality of browsers. The one or more instructions may cause the one or more processors to select a first automation script to test the code based on a characteristic of the code and may assign the first automation script to each virtual machine of a first set of the plurality of virtual machines to test the code. The one or more instructions may cause the one or more processors to monitor execution of the first automation script within each browser of the plurality of browsers running on each of the first set of the plurality of virtual machines, wherein, during execution of the first automation script, each browser of the plurality of browsers running on each of the first set of the plurality of virtual machines uses the first automation script to access a system under test (SUT). The one or more instructions may cause the one or more processors to perform an action associated with the execution of the first automation script by each virtual machine of the first set of the plurality of virtual machines.

BRIEF DESCRIPTION OF THE DRAWINGS

FIG. 6 is a flow chart of an example process associated with user interface based performance testing.

DETAILED DESCRIPTION

Figure 1:
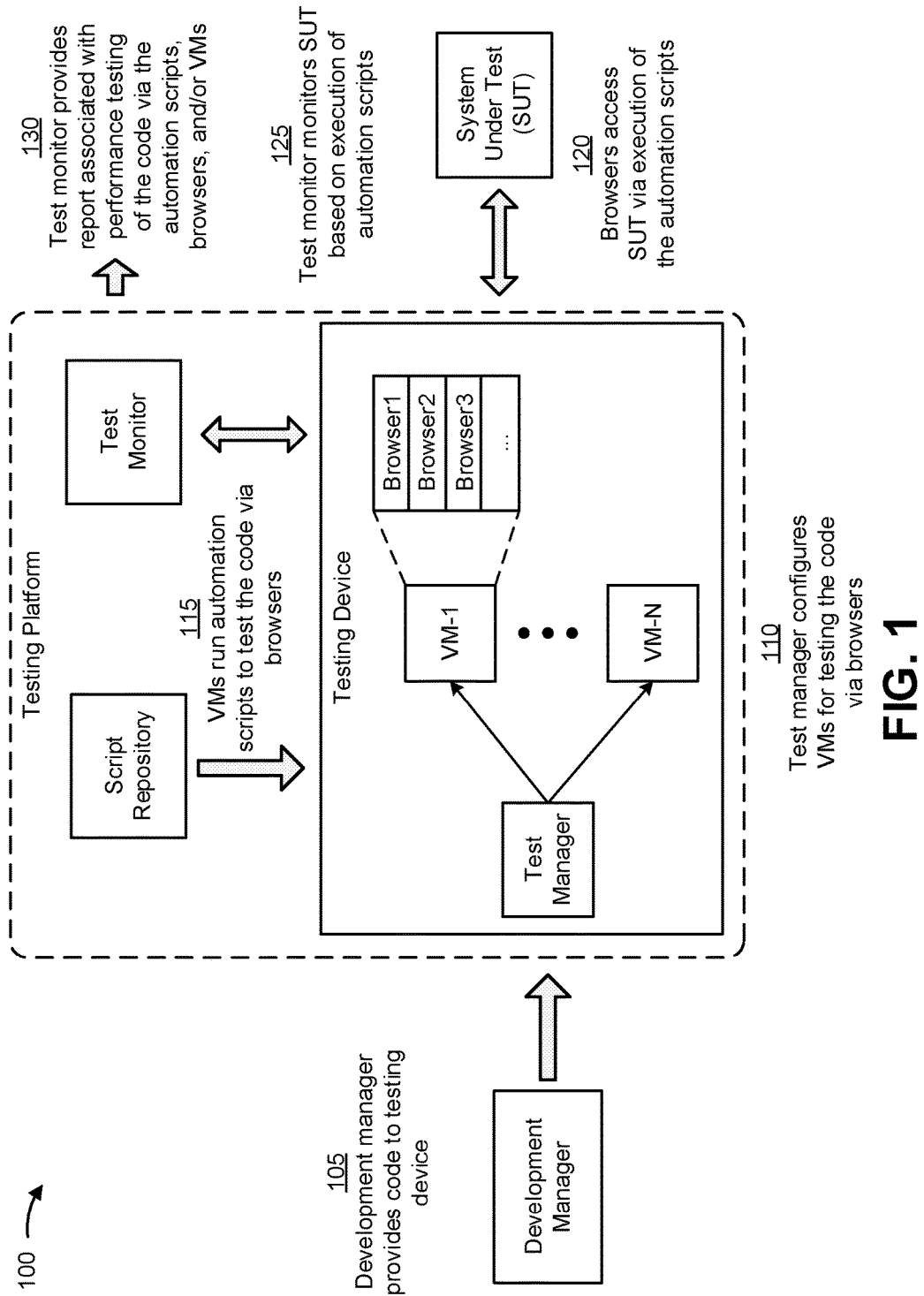
FIG. 1 is a diagram of an example implementation described herein.

The following detailed description of example implementations refers to the accompanying drawings. The same reference numbers in different drawings may identify the same or similar elements.

In some instances, performance testing tools use automation scripts to test code of a system under test (SUT). The automation scripts, when executed, perform tests on the code. The automation scripts may include a set of functional tests and/or performance tests. The automation scripts, when executed, take the place of a desktop, operating system, and/or a browser of a computer to perform the functional tests and/or performance tests to test the code. However, in such instances, for each set of code that is to be tested and/or each time code for a SUT is modified, automation scripts are to be correspondingly generated and/or customized according to any modifications made to the code. As such, in previous techniques, automation scripts cannot be reused for various versions of a code and/or various types of a code. Furthermore, such performance testing tools may only be configured and/or manually set up to run automation scripts via a single operating system, desktop, and/or browser. Accordingly, for multiple iterations of executing the automation scripts to test the code, a user (e.g., a developer) may need to use the performance testing tools to manually assign and/or execute the automation scripts using a corresponding number of operating systems, desktops, and/or browsers of a corresponding number of computers.

Some implementations described herein provide a testing platform that enables reuse of automation scripts in performance testing and automated scalability of the performance testing to increase a number of performance tests that are to be run on a SUT. In some implementations, a testing platform may include and/or access a script repository that includes a plurality of automation scripts (e.g., automation scripts that were previously used to test previous versions and/or functions of a code). Furthermore, the testing platform may generate, implement, and/or access a plurality of virtual machines to perform the testing. For example, each of the plurality of virtual machines may host or run one or more browsers that execute one or more of the plurality of automation scripts from the script repository, as described herein. In such cases, to perform performance testing, virtual user interfaces may access features of the code and/or simulate a virtual user experience associated with accessing features of the code via the automation scripts.

Accordingly, some implementations described herein may conserve processing resources and/or network resources by enabling reuse of automation scripts for performance testing. For example, for each update to a code associated with a SUT, some implementations may avoid using processing resources that may otherwise be used to create new or custom automation scripts for performance testing of the code and/or avoid using network resources that may otherwise be used to upload and/or provide the new or custom automation scripts to a testing platform. Furthermore, some implementations described herein can conserve processing resources and/or network resources associated with performance testing that is performed on multiple operating systems, desktops, and/or browsers of multiple devices. Such implementations, described herein, may enable a single device (e.g., a server device) or a single environment to allow for performance testing that involves a relatively large volume of requests (e.g., via browsers) to an SUT, relative to previous techniques which may require multiple devices or environments to perform the browser requests. For example, some implementations described herein can monitor performance testing via a plurality of virtual machines implemented on a single device and generate a single report that can identify successes or failures of functional tests and/or performance tests of automation scripts executed via browsers hosted by the plurality of virtual machines.

In this way, several different stages of a process for performance testing can be automated, which may remove human subjectivity and waste from the process, and which may improve speed and efficiency of the process and conserve processing resources and/or network resources. Furthermore, some implementations described herein use a rigorous, computerized process to perform tasks or roles that were not previously performed or were previously performed using subjective human intuition or input. For example, currently there does not exist a technique for performance testing that enables reuse of automation scripts and/or automatically scaling performance testing to a plurality of VMs to perform performance tests. Finally, automating the process for performance testing, as described herein, conserves processing resources (e.g. processor resources, memory resources, and/or the like) and/or network resources, as described herein.

FIG. 1 is a diagram of an example implementation 100 described herein. Example implementation 100 includes a development manager, a testing platform with a script repository, a testing device, and a test monitor, and a SUT. The development manager may include a platform and/or user device (e.g., a computer, a smartphone, and/or the like) that may be used to generate code for testing. The SUT may include any type of platform (e.g., an application platform, a service platform, and/or the like) or system (e.g., a control system, a diagnostic system, a monitoring system, and/or the like) that can be implemented and/or updated via the code. Accordingly, the code from the development manager may be used to build and/or implement the SUT and/or may be used to implement a feature of SUT. The SUT may be hosted by a computer, a server, a cloud environment, and/or the like.

The testing platform may store automation scripts in the script repository (e.g., to enable reuse of the automation scripts). The testing platform, via the testing device and/or the test manager, may distribute and/or allocate the automation scripts to VMs that host browsers to test the code by accessing the SUT via the automation scripts. Further, the testing platform, via the test monitor, monitors the execution of the automation scripts by the VMs via the browsers. Therefore, according to some implementations described herein, the testing platform facilitates performance testing of code (e.g., an update or new version of code used to implement the SUT, new code that is to be added to the code used to implement the SUT, and/or the like) for the SUT that is received from the development manager.

As shown in FIG. 1, and by reference number 105, the development manager provides code to the testing device. For example, a user (e.g., a software developer, an application developer, and/or the like) may generate the code (e.g., via a user device) and seek to test the code to identify any bugs in the code, see how the code may affect the SUT (e.g., a load of the SUT, a stability of the SUT, a performance speed of the SUT, and/or the like), and/or the like.

In some implementations, the code may be configured for use in a browser and/or configured to be tested via a browser. In some implementations, the code may be configured for use outside of a browser and/or configured to be tested outside of a browser. The code may include an update to the SUT, a feature of the SUT, software to implement the SUT, an application programming interface (API) associated with the SUT, and/or the like.

In some implementations, the code may be associated with providing a particular service (e.g., a financial service, a messaging service, a social media service, a navigation service, a shopping service, a web browsing service, a media streaming service, and/or the like). For example, to enable the SUT to provide one or more financial services, the code may be associated with facilitating a financial transaction, accessing a banking account service, receiving a financial consultation service, accessing an investment banking service, receiving a transaction card service, performing a deposit transaction, performing a withdrawal transaction, performing a currency transfer, performing a bill payment, accessing a loan service, or requesting a cash delivery service.

As further shown in FIG. 1, and by reference number 110, the test manager of the testing device configures virtual machines (VMs) for testing the code via browsers. For example, the test manager may access a set of VMs hosted by the testing platform or in another environment (e.g., a cloud environment), allocate available VMs for testing (e.g., by assigning the VM to test the code), generate VMs for testing (e.g., by allocating and/or configuring resources of the testing platform and/or an environment hosting the VMs), and/or the like. The test manager and/or the VMs may be hosted within a same environment (e.g., a same cloud environment). For example, the VMs may be hosted within the testing platform of FIG. 1.

In some implementations, the test manager may be configured to automatically configure the VMs based on one or more characteristics of the code. For example, the test manager may analyze the code and information associated with the code (e.g., information in a data file or message provided from the development manager along with the code that includes instructions or parameters for performing the performance tests) to determine which automation scripts are to be used to test the code, as described herein. In some implementations, the test manager may determine one or more parameters (e.g., from the code and/or from information provided with the code) of the performance testing to be performed on the code and/or performance requirements (e.g., speed, reliability, and/or the like) associated with the SUT. Based on the automation scripts, the one or more parameters for performing the performance tests, and/or the performance requirements of the SUT, the test manager identifies VMs or generates VMs (e.g., by allocating resources (e.g., processing resources memory resources, and/or the like) of an environment that is to host the VMs) that are capable of executing the automation scripts and performing the performance tests according to the one or more parameters and/or performance requirements. For example, the test manager may identify available VMs that have the resources needed to run the automation scripts according to the one or parameters to test the code and/or performance requirements. Additionally, or alternatively, the test manager may generate the VMs (e.g., if necessary or enough VMs are not available) by allocating resources (e.g., processing resources, memory resources, and/or the like) of an environment (e.g., a cloud environment) that is to host the VMs. In such a case, the amount and type of allocated resources may be based on the automation scripts, the one or more parameters for testing the code, and/or the performance requirements of the SUT. Accordingly, the test manager may configure the VMs for performance testing of the code.

In some implementations, the test manager may determine a number of VMs and/or a number of browsers that are to be configured to test the code. For example, the test manager may determine a characteristic associated with the SUT and/or an application hosted by the SUT. For example, the characteristics may correspond to a number of users that access the SUT on average and/or at a particular time, a speed requirement of the SUT, reliability requirements of the SUT, and/or the like. As a more specific example, when a performance test of the code is to simulate a number of users accessing the SUT at a same time, the test manager may access and/or generate a corresponding number of VMs to use browsers to access the SUT to test the code. Accordingly, when functional tests and/or performance tests are run (e.g., via the browsers), the test monitor can analyze how the SUT performs under that particular load. Additionally, or alternatively, the number of VMs accessed and/or generated may correspond to a total number of users associated with the SUT (e.g., a number of subscribers to a service provided by the SUT), a maximum number of users that have accessed the SUT at a particular time, a number of users that accessed the SUT during a particular event (e.g., a crash of the SUT, and/or the like), a current number of users accessing the SUT, a number of registered accounts associated with the SUT, and/or the like. In some implementations, the test manager may access, generate, and/or configure hundreds, thousands, millions, or more VMs to simulate a corresponding number of users accessing the SUT and/or accessing the code being tested.

In some implementations, the test manager may use machine learning to train a model for selecting a number of VMs that are to be activated and/or configured to test the code. For example, the test manager may train the model for selection of the number of VMs based on one or more parameters for testing the code, such as one or more characteristics of the SUT, one or more characteristics of the code (e.g., or a feature implemented by the code), one or more characteristics of computing resources implementing the VMs (e.g., load, availability, processing speed, amount of memory available, geographic location, security, an operating system of the computing resources, a capability of using an operating system, and/or the like), one or more characteristics of the VMs (e.g., available processing resources of the VMs, available memory resources of the VMs, a maximum number of browsers that can run on the VMs, a maximum quantity of different browsers that can run on the VMs, types of browsers that can run on the VMs, and/or the like), one or more characteristics of the browsers to be used to test the code (e.g., browser availability on the VMs, browser processing capabilities, browser speed, and/or the like), one or more characteristics of automation scripts to be used to test the code (e.g., which functional tests are included in the automation scripts, which performance tests are included in the automation script, which objects are included in the automation script, and/or the like), and/or the like. The test manager may train the model using historical data associated with performance testing the code and/or the SUT (e.g., using past performance tests on previous versions of the code, past performance tests on a same type of code, past performances tests of the SUT, and/or past performance tests of a same type of SUT). Using the historical data and the one or more parameters for testing the code (e.g., using the one or more features as inputs to the model for selecting the number of VMs), the test manager may predict or select a number of VMs that are to be used to test the code.

In some implementations, the test manager may be configured to automatically select which automation scripts are to be used to test the code based on a characteristic of the code, based on one or more parameters to test the code, based on performance requirements of the SUT, and/or the like. For example, the test manager may analyze the code to identify one or more objects or functions of the code that can be tested using one or more automation scripts within the script repository. In such cases, the test manager may refer to the script repository using the objects or functions (e.g., the script repository may include an index and/or mapping of objects or functions to automation scripts that are to be run to test the objects or functions). For example, if the code includes a function that is to enable a user to perform a financial transaction, the test manager may identify an automation script for testing financial transaction functionality in the script repository. The test manager may select the automation script, which includes functional tests and/or performance tests to test that financial transaction, based on the automation script being associated with the financial transaction functionality. As a more specific example, the functional tests of the automation scripts may simulate a user logging into an account of the SUT, navigating the SUT to perform the financial transaction, simulating the financial transaction (e.g., simulate a transfer of funds), and completing the performance of the financial transaction (e.g., ending the transaction, updating balances, and/or the like). Furthermore, in such a case, the performance tests may enable monitoring or tracking of the success or failure of each of the functional tests.

In some implementations, the test manager may use machine learning to train a model for selecting which automation scripts are to be used to test the code. For example, the test manager may train the model for selection of the automation scripts based on one or more parameters associated with the code, such as a type of update associated with the code (e.g., whether the code is a new version of an old code or a portion of the old code, whether the code includes an added feature or function and is to be appended to current code, and/or the like), based on one or more objects or functions of the code, based on a number of objects or a number of functions in the code, based on a size of the code, based on performance requirements of the code, based on information provided in association with the code, and/or the like. The test manager may train the model using historical data associated with selecting automation scripts for performance testing based on one or more parameters associated with previous codes and/or previous versions of the code. Accordingly, based on the historical data and the one or more parameters associated with the code, the test manager can select automation scripts that are to be executed to test the code.

In some implementations, the test manager assigns the automation scripts to the VMs and/or browsers of the VMs. For example, the test manager may randomly assign the automation scripts to the VMs. Additionally, or alternatively, the test manager may assign the automation scripts to the VMs based on one or more parameters for assigning the automation scripts. For example, the one or more parameters for assigning the automation scripts may include one or more characteristics of the VMs (e.g., a load of the VM, availability of the VM, a location of the VM (e.g., a geographical location and/or a logical location within the network), the number of VMs being used to test the code, the performance capability of the VM, an operating system of the VM, and/or the like). Additionally, or alternatively, the one or more parameters for assigning the automation scripts may include one or more characteristics of the browsers (e.g., whether the browsers are capable of executing the automation scripts, the number of browsers being used to test the code, the number of browsers on each VM that are being used to test the code, the types of browsers being used to test the code, whether different types of browsers or the same type of browser are being used to test the code, and/or the like). The one or more parameters for assigning the automation scripts may include one or more characteristics of the automation scripts (e.g., resource requirements (e.g., an amount of processing resources, memory resources, and/or the like that are needed to test the code), types of functional tests and/or performance tests that are included in the automation scripts, and/or the like). In some implementations, the test manager may use machine learning to train a model for assigning the automation scripts to the VMs. The test manager may use historical data and the one or more parameters for assigning the automation scripts to the VMs as inputs to the model for assigning the automation scripts and automatically generate an assignment of the automation scripts to corresponding VMs based on the model.

In some implementations, the test manager may assign multiple VMs and/or browsers to execute a same automation script to determine a reliability of the SUT (e.g., a percentage of times the code and/or SUT performed as expected). In such cases, the testing platform can simulate a plurality of users accessing the SUT in a similar manner (e.g., according to the functions of the automation scripts). Additionally, or alternatively, the test manager may assign multiple VMs and/or browsers to run different automation scripts (e.g., to simulate a variety of different functions to test the code). As such, the test manager may assign a first set of browsers (or VMs) to run a first automation script and a second set of browsers (or VMs) to run a second set of automation scripts, that are different than the first automation scripts. In some implementations, the test manager may assign which VMs are to run which automation scripts via which browsers based on one or more settings of the testing platform, which may be configured via a user input or information received from the development manager (e.g., in association with providing the code for testing), and/or machine learning, as described herein.

In some implementations, the test manager configures the VMs to host browsers to access the code. The test manager may configure the VMs to host the browsers according to one or more parameters to test the code and/or one more settings of the testing platform. The test manager may configure which types of browsers and/or a number of browsers that are to be hosted by each VM according to the one or more parameters provided with the code and/or the one or more settings of the testing platform (which can be adjusted by a user or developer via the development manager). As such, the test manager may configure each of the VMs to host one or more browsers that are to be used to test the code.

In some implementations, each VM is to host a single browser to test the code. In such cases, each VM may host a same type of browser or a different type of browser than another VM. Accordingly, a first set of the VMs may host a first type of browser and a second set of the VMs may host a second type of browser that is different than the first type of browser. In some implementations, each of the VMs are to host multiple browsers. In such cases, the multiple browsers may be different instances of a same type of browser and/or include different types of browsers. In some implementations, a number of a plurality of VMs is equal to or corresponds to a number of a plurality of browsers. In such cases, each VM, of the plurality of VMs, runs one browser of the plurality of browsers. Therefore, in such cases, the number of browsers may be based on a characteristic of the SUT and/or a characteristic of an application hosted by the SUT because the number of VMs used to host the number of browsers may be based on the characteristic of the SUT.

As further shown in FIG. 1, and by reference number 115, the VMs run automation scripts for performance testing of the code via the browsers. As mentioned above, the test manager may select which automation scripts from the script repository are to be run by the VMs. The automation scripts may include one or more scripts (e.g., testing scripts) that, when executed, perform one or more functional tests (e.g., through executing functions) or performance tests (e.g., through monitoring executed functions). The functional tests may perform actions (e.g., provide inputs) to test particular functions and the performance tests may track results of performing the actions. As such, the browsers may run the automation scripts to simulate a user experience and/or access to the SUT via a user interface.

In example implementation 100 of FIG. 1, the automation scripts can be stored in the script repository. The script repository may be implemented by one or more storage devices or virtual storage devices of the testing platform and/or any other environment. In some implementations, the script repository includes a data structure (e.g., a database, an index, a table, a task graph, a mapping, and/or the like) for accessing the automation scripts. The data structure may be configured according to one or more settings of the testing platform, which may be configured via user input and/or input received via the development manager.

In some implementations, the script repository is preloaded and/or configured to store automation scripts for performance testing. For example, one or more users (e.g., developers) may have access to the script repository to enable automation scripts to be added to the script repository. In some implementations, the script repository can be automatically populated with automation scripts based on execution of automation scripts. For example, an automation script may be provided along with the code (e.g., via the development manager) for testing. In such cases, if the automation script is not included within the script repository (e.g., the automation script is a new automation script), the automation script can be added to the script repository. The test manager may determine whether the automation scripts provided with the code are not in the script repository by referencing or querying a data structure of the script repository. In some implementations, the test manager may use a hash of the received automation script and compare the hash of the received automation script to hashes of the automation scripts in the script repository. If the hash of the received automation script does not match the hashes of the automation scripts in the script repository, the test manager may determine that the received automation script is a new automation script and add the automation script to the script repository. As such, if the test manager determines that a new automation script is not in the script repository, the test manager can add the automation script to the test repository.

In some implementations, the script repository, after selection or assignment of automation scripts, can be sorted, organized, and/or the like based on the selection and/or use of the automation scripts to test codes, as described herein. For example, the script repository can be sorted according to frequency of use and/or organized to identify which automation scripts were used to test which features of the code. As such, the script repository can be arranged to reduce processing time to identify and/or obtain automation scripts for testing the code. In some implementations described herein, the script repository can be sorted and/or organized using artificial intelligence for managing the script repository. In such cases, the testing platform may use features of the automation script (e.g., functional tests and/or performance tests included in the automation scripts, features associated with the automation scripts, users (e.g., developers) associated with the automation scripts, organizations and/or industries associated with the automation scripts, and/or the like) for use by the artificial intelligence. The testing platform may use historical data associated with how the script repository was previously sorted and/or organized during previous performance tests and may resort or reorganize the automation scripts within the script repository based on the artificial intelligence for managing the script repository.

As further shown in FIG. 1, and by reference number 120, the browsers access the SUT via execution of the automation scripts. Prior to execution of the automation scripts, the SUT may be automatically built via running the code that is to be tested, as described herein. For example, when code is received via the development manager, the testing platform may automatically build the SUT with the code. In some implementations, automatically building the SUT may be based on one or more parameters of the code. For example, when the code is a new version of code of the SUT, current code for the SUT may be cleared and/or overwritten with the new code. If the code is to be added or appended to the SUT, the SUT may be built by pausing execution of the code, automatically adding the code to the current code of the SUT, and rebuilding the SUT. In such cases, the testing platform may identify where the code is to be added and/or inserted within the current code of the SUT. In such cases, the testing platform may determine where the code is to be inserted based on one or more parameters of the code and/or one or more parameters of the current code. For example, the testing platform may identify one or more objects or functions within the code, determine one or more locations within the current code that includes the same or similar objects or codes, and insert the code into the current code to enable the SUT to be built with the new code. In some implementations, if the code is unsuccessfully built based on inserting the code within the current code, the testing platform may reconfigure the code or current code and/or reconfigure the build of the SUT by moving the code to a different location within the current code (e.g., another location that includes the same or similar objects or functions of the code). In some implementations, the testing platform may use machine learning to train a model for building the SUT. For example, the testing platform may use historical data, features of the code, and/or features of the current code, to train the model for building the SUT. Accordingly, the testing platform may automatically build the SUT with the code that is to be tested.

During the performance testing, the VMs may execute the automation scripts that are assigned to the VMs, as described herein. According to some implementations, executing the automation scripts causes the browsers to access the SUT (which is being implemented by execution of the code being tested) according to functional tests and/or performance tests of the automation scripts. Such access to the SUT may simulate user interface accesses (e.g., as if a user were accessing the SUT via a user interface of the SUT) and/or a user interface experience.

In some implementations, the VMs may be configured to execute the automation scripts in a particular manner and/or in a particular order. For example, the VMs may be configured to access the SUT simultaneously and/or at different times to simulate different scenarios and/or ways in which a plurality of users may access the SUT. In some implementations, the VMs may be configured to execute the automation scripts to simulate a period of activity (e.g., a previously experienced period of activity). For example, the VMs may be configured to execute the automation scripts to simulate a high-load period of a day (e.g., during daytime hours) and/or a low-load period of the day (e.g., during night-time hours). In some implementations, the testing platform (e.g., via the test monitor) may be configured to monitor activity of the SUT to identify patterns of activity (e.g., patterns of users accessing and/or using features of the SUT) that can be simulated and/or reenacted via execution of automation scripts by the VMs, as described herein. Accordingly, the testing platform (e.g., via the test manager), can configure the VMs to execute the automation scripts and cause the browsers to access the SUT in a manner to simulate the patterns of activity.

Accordingly, the VMs executing the assigned automation scripts to cause the browsers to access the SUT, can simulate the effect of the code on the SUT. Therefore, the performance testing, as described herein, can simulate a load or stress on the SUT caused by the number of browsers accessing the SUT.

As further shown in FIG. 1, and by reference number 125, the test monitor monitors the SUT based on the execution of the automation scripts. To monitor the SUT, the test monitor may have access to performance tests included within the automation scripts to identify how to monitor the SUT based on the execution of the automation scripts. For example, the performance tests may indicate pass/fail thresholds associated with performance of one or more functions of the automation scripts (e.g., timing thresholds, speed thresholds, reliability thresholds, and/or the like), performance requirements for the SUT (e.g., that the SUT is to maintain a particular operation speed, a particular capacity, a particular reliability, and/or the like), and/or the like. Based on the execution of the automation scripts, which may cause functions of the functional tests to be performed via the browsers accessing the SUT, the test monitor may track when the pass/fail thresholds are satisfied, when performance requirements are met and/or not met, the performance of the functions of the code during execution, the performance of the SUT during execution of the automation scripts (or during the performance testing), the performance of the SUT for a period of time after the execution of the automation scripts (or after the performance testing is complete), the performance of the SUT during execution of a particular functional test of an automation script and/or after execution of the particular functional test, and/or the like. Accordingly, the test monitor may track or monitor the performance of the SUT, as built from the code, according to the performance tests of the automation scripts in order to monitor the performance of the code.

As an example, performance tests of an automation script may indicate timing requirements, speed requirements, and/or the like that are associated with performing corresponding functions (e.g., that is defined by a functional test) of the automation script. The execution of the automation script may result in the code passing or failing one or more of the performance tests depending on the SUT satisfying one or more of the timing requirements, speed requirements, and/or the like associated with the one or more functions being tested. Accordingly, while monitoring the execution of the automation scripts, the test monitor may track the performance of the code via the functional tests and/or performance tests of the automation scripts.

According to some implementations, the test monitor may monitor the execution of the automation scripts for a period of time, which may be referred to as a testing period. In some implementations, the testing period may correspond to a length of time that it takes for the VMs to run all automation scripts that are assigned to the VMs in the particular manner in which the VMs were configured to execute the automation scripts. In some implementations, the testing period may include a length of time after the execution of the automation scripts. For example, the test monitor may monitor the SUT for a period of time after the automation scripts are executed to determine if the execution of the automation scripts has any long term effects on the SUT (relative to the length of time that it takes to execute the automation scripts).

As further shown in FIG. 1, and by reference number 130, the test monitor provides a report associated with the performance testing of the code via the automation scripts, browsers, and/or VMs. The report may be automatically generated according to the performance of the SUT (and/or objects or functions of the code) during execution of each of the automation scripts by each of the browsers running on each of the VMs. In some implementations, the report can indicate an overall performance of the SUT throughout execution of the automation scripts by the browsers (e.g., an overall pass or fail of code), individual instances of functional tests and/or performance tests of each of the automation scripts passing or failing, and/or the like. In some implementations, speeds and times associated with functional tests of the automation scripts, failures and/or errors associated with the SUT or an application associate with the SUT, and/or the like can be tracked and/or logged in the report. Furthermore, in some implementations, statistics can be automatically calculated and/or generated for each browser or across all browsers, for each VM or across all VMs, for each automation script or across all automation scripts, for each performance test of the automation scripts or across all performance tests, and/or the like. Accordingly, the test monitor may log a success or failure of functional tests and/or performance tests of the automation script during the execution of the automation script by each of the VMs via each of the browsers.

In some implementations, the report can be returned and/or fed back to the testing platform. In some implementations, the testing platform may use machine learning to train a model for identifying errors in the code and/or revising the code based on the report. For example, the testing platform may use historical data associated with performance testing of previous versions of the code. Such historical data may include previous reports generated from performance testing the code. The testing platform, using the historical data and the report as inputs, may then identify and/or determine errors in the code. Accordingly, such errors can be addressed by the testing platform (and/or manually by a developer).

Additionally, or alternatively, the report can be fed back to the development manager, such that a user (e.g., a developer) may identify the performance of the SUT as built from the code and identify any changes that may need to be made to the code based on the report.

Accordingly, example 100 of FIG. 1 provides a testing environment that enables code for an SUT to be tested by automatically selecting automation scripts for testing the code and assigning the automation scripts to a plurality of VMs and/or browsers to test the code. As described herein, the automation scripts can be selected and/or obtained from a script repository to test a code. As such, the automation scripts (and/or portions of automation scripts) can be reused to test multiple iterations or versions of the code and/or other codes, and custom automation scripts do not need to be generated (e.g., by a developer) for each code or for each release or update to a code. Furthermore, example 100 enables automatic scalability of performance testing. Performance testing can be performed simultaneously by a plurality of VMs to provide an accurate simulation of an SUT being implemented by a code that is being tested. Furthermore, example implementation 100 enables the automated selection and allocation of automation scripts to VMs to test the code, enabling conservation of user resources, processing resources, and networking resources to perform the performance testing.

As indicated above, FIG. 1 is provided merely as an example. Other examples are possible and may differ from what was described with regard to FIG. 1.

Figure 2:
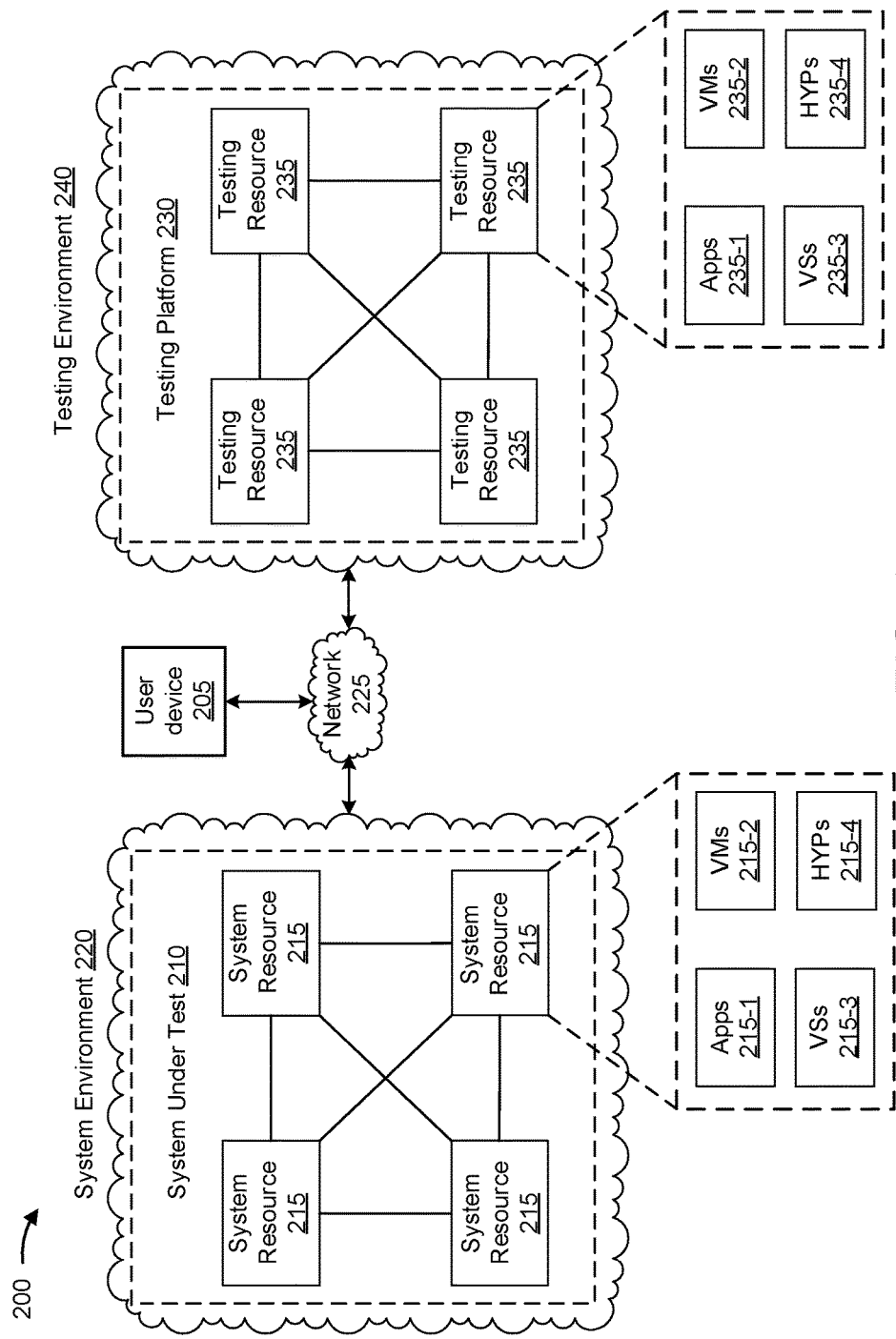
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a system under test (SUT) 210 with system resources in a system environment 220, a network 225, and a testing platform 230 with testing resources 235 in a testing environment 240. Devices of environment 200 may interconnect via wired connections, wireless connections, or a combination of wired and wireless connections.

User device 205 includes one or more devices capable of receiving, generating, storing, processing, and/or providing information associated with user interface (UI) based performance testing. For example, user device 205 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

System under test (SUT) 210 includes one or more devices capable of receiving, generating, storing, processing, and/or providing information associated with user interface (UI) based performance testing. For example, SUT 210 may include a service platform including a server device (e.g., a host server, a web server, an application server, etc.), a data center device, or a similar device, and/or the like. SUT 210 may be built to include features associated with a code that is being tested and/or generated from the code that is being tested.

System environment 220 includes an environment (e.g., a cloud environment) that delivers computing as a service, whereby shared resources, services, etc. may be provided to user device 205. System environment 220 may provide computation, software, data access, storage, and/or other services that do not require end-user knowledge of a physical location and configuration of a system and/or a device that delivers the services. As shown, system environment 220 may include SUT 210 and one or more system resources 215.

System resource 215 includes one or more personal computers, workstation computers, server devices, or another type of computation and/or communication device. In some implementations, one or more system resources 215 may host SUT 210. The cloud resources may include compute instances executing in system resource 215, storage devices provided in system resource 215, data transfer devices provided by system resource 215, etc. In some implementations, system resource 215 may communicate with other system resources 215 via wired connections, wireless connections, or a combination of wired and wireless connections.

As further shown in FIG. 2, system resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by user device 205. Application 215-1 may eliminate a need to install and execute the software applications on user device 205. For example, application 215-1 may include software associated with SUT 210 and/or any other software capable of being provided via system environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program and may support a single process. In some implementations, virtual machine 215-2 may execute on behalf of a user (e.g., user device 205), and may manage infrastructure of system environment 220, such as data management, synchronization, or long-duration data transfers.

Virtualized storage 215-3 includes one or more storage systems and/or one or more devices that use virtualization techniques within the storage systems or devices of system resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as system resource 215. Hypervisor 215-4 may present a virtual operating platform to the guest operating systems and may manage the execution of the guest operating systems. Multiple instances of a variety of operating systems may share virtualized hardware resources.

Network 225 includes one or more wired and/or wireless networks. For example, network 225 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Testing platform 230 includes one or more devices capable of receiving, generating, storing, processing, and/or providing information associated with user interface (UI) based performance testing. For example, testing platform 230 may include a performance testing platform that enables reuse of automation scripts and performance testing scalability to increase a number of performance tests that are to be run on SUT 210. Testing platform 230 may include a test manager that configures virtual machines (VMs) for testing, a script repository to store automation scripts (e.g., via VSs 235-3), and a test monitor to monitor and/or generate a report associated with the testing. The VMs (e.g., VMs 235-2) may run code in browsers that run automation scripts for performance testing of the code in the browsers.

Testing environment 240 includes an environment (e.g., a cloud environment) that delivers computing as a service, whereby shared resources, services, etc. may be provided for user device 205 and/or SUT 210. Testing environment 240 may provide computation, software, data access, storage, and/or other services that do not require end-user knowledge of a physical location and configuration of a system and/or a device that delivers the services. As shown, testing environment 240 may include testing platform 230 and testing resources 235.

Testing resource 235 includes one or more personal computers, workstation computers, server devices, or another type of computation and/or communication device. In some implementations, testing resource 235 may host testing platform 230. The cloud resources may include compute instances executing in testing resource 235, storage devices provided in testing resource 235, data transfer devices provided by testing resource 235, etc. In some implementations, testing resource 235 may communicate with other testing resources 235 via wired connections, wireless connections, or a combination of wired and wireless connections.

As further shown in FIG. 2, testing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 (Apps 235-1) includes one or more software applications that may be provided to or accessed by user device 205. Application 235-1 may eliminate a need to install and execute the software applications on user device 205. For example, application 235-1 may include software associated with testing platform 230 and/or any other software capable of being provided via testing environment 240. In some implementations, one application 235-1 may send/receive information to/from one or more other applications 235-1, via virtual machine 235-2.

Virtual machine 235-2 (VMs 235-2) includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of a user (e.g., user device 205), and may manage infrastructure of testing environment 240, such as data management, synchronization, or long-duration data transfers. A plurality of virtual machines 235-2 may be included in testing platform 230 and may be configured for testing. Each virtual machine 235-2 may host one or more browsers that are to be used to test code of SUT 210, as described herein. In some implementations, a number of virtual machines 235-2 may be equal to or correspond to a number of the browsers.

Virtualized storage 235-3 (VSs 235-3) includes one or more storage systems and/or one or more devices that use virtualization techniques within the storage systems or devices of testing resource 235. For example, virtualized storage 235-3 may store a script repository as described herein. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as testing resource 235. Hypervisor 235-4 may present a virtual operating platform to the guest operating systems and may manage the execution of the guest operating systems. Multiple instances of a variety of operating systems may share virtualized hardware resources.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
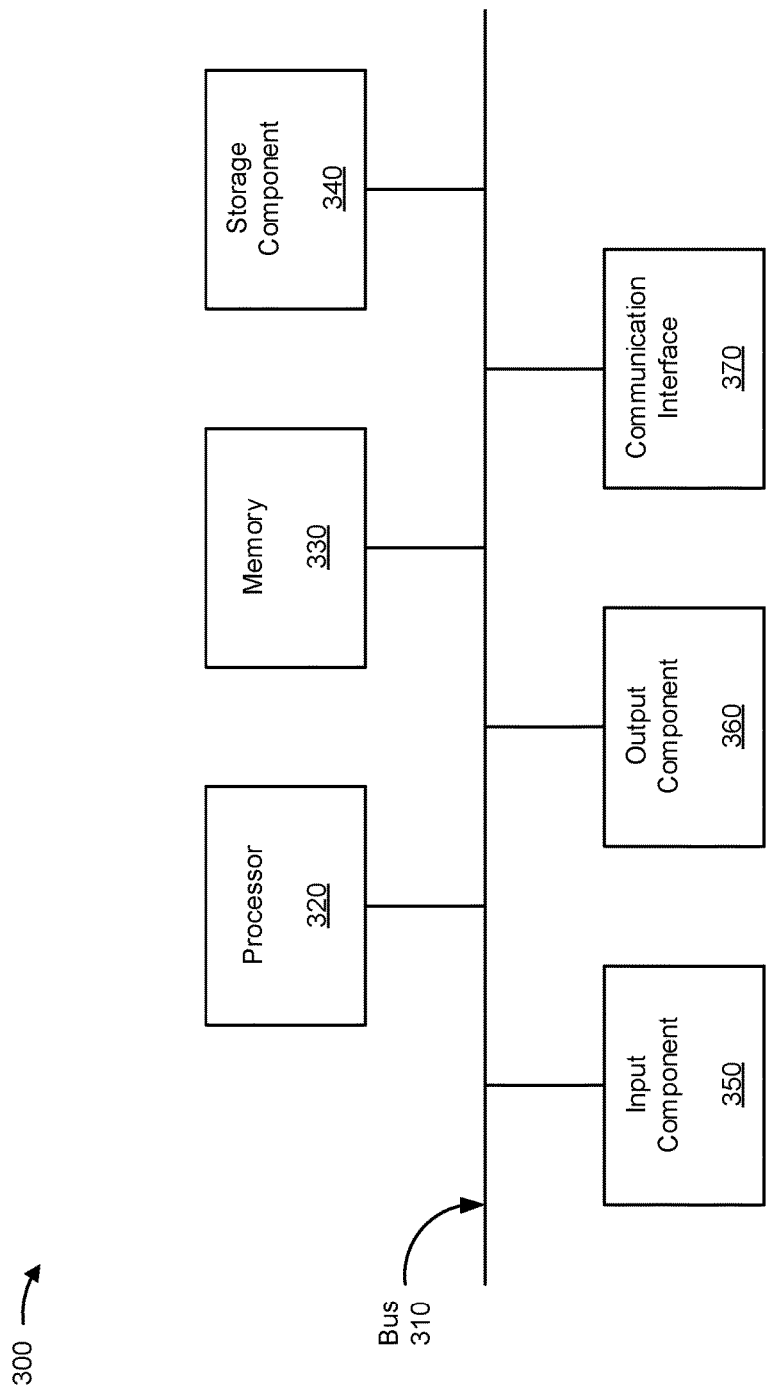
FIG. 3 is a diagram of example components of one or more devices of FIG. 2.

FIG. 3 is a diagram of example components of a device 300. Device 300 may correspond to user device 205, SUT 210, system resource 215, testing platform 230, and/or testing resource 235. In some implementations, user device 205, SUT 210, system resource 215, testing platform 230, and/or testing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
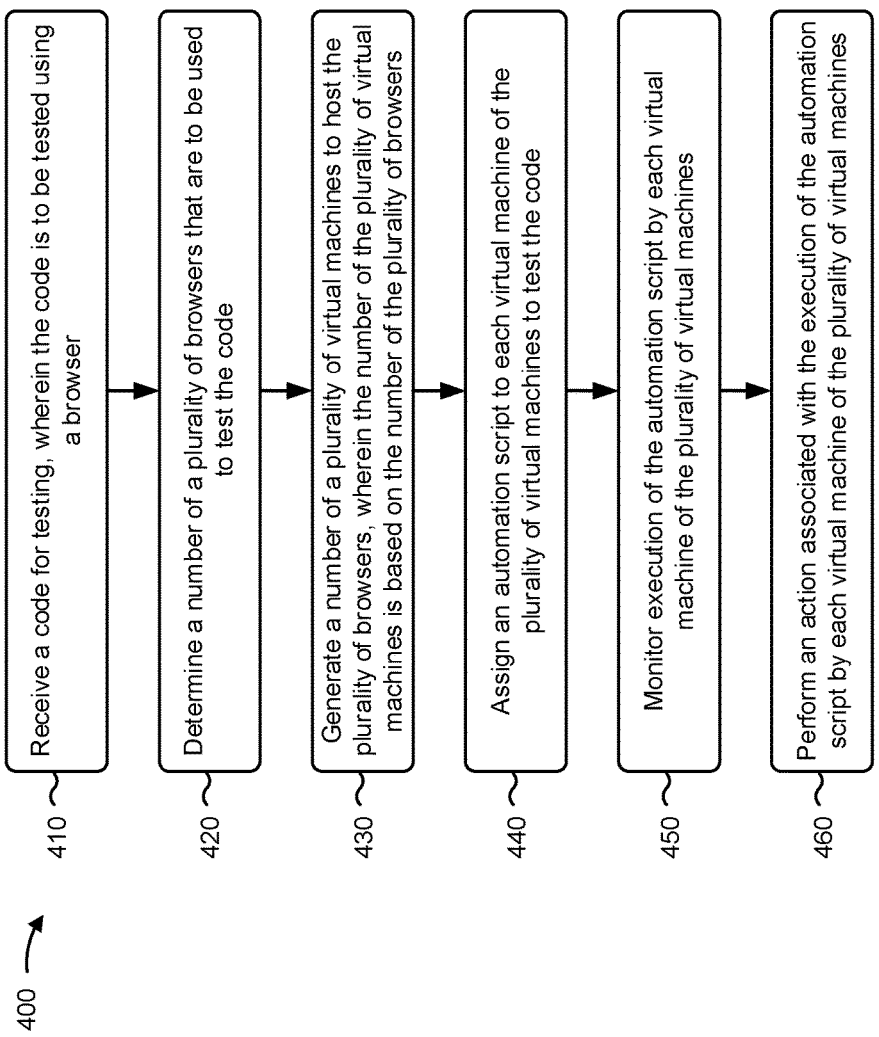
FIG. 4 is a flow chart of an example process associated with user interface based performance testing.

FIG. 4 is a flow chart of an example process 400 associated with user interface (UI) based performance testing. In some implementations, one or more process blocks of FIG. 4 may be performed by a testing platform (e.g., testing platform 230). In some implementations, one or more process blocks of FIG. 4 may be performed by another device or a group of devices separate from or including the testing platform (e.g., testing platform 230), such as a user device (e.g., user device 205), SUT 210, system resource 215, or a testing resource (e.g., testing resource 235).

As shown in FIG. 4, process 400 may include receiving a code for testing, wherein the code is to be tested using a browser (block 410). For example, the testing platform (e.g., using testing resource 235, processor 320, memory 330, storage component 340, input component 350, communication interface 370, and/or the like) may receive a code for testing, as described above in connection with FIG. 1. In some implementations, the code may be tested using a browser.

As further shown in FIG. 4, process 400 may include determining a number of a plurality of browsers that are to be used to test the code (block 420). For example, the testing platform (e.g., using testing resource 235, processor 320, memory 330, storage component 340, and/or the like) may determine a number of a plurality of browsers that are to be used to test the code, as described above in connection with FIG. 1.

As further shown in FIG. 4, process 400 may include generating a number of a plurality of virtual machines to host the plurality of browsers, wherein the number of the plurality of virtual machines is based on the number of the plurality of browsers (block 430). For example, the testing platform (e.g., using testing resource 235, processor 320, memory 330, storage component 340, and/or the like) may generate a number of a plurality of virtual machines to host the plurality of browsers, as described above in connection with FIG. 1. In some implementations, the number of the plurality of virtual machines may be based on the number of the plurality of browsers.

As further shown in FIG. 4, process 400 may include assigning an automation script to each virtual machine of the plurality of virtual machines to test the code (block 440). For example, the testing platform (e.g., using testing resource 235, processor 320, memory 330, storage component 340, and/or the like) may assign an automation script to each virtual machine of the plurality of virtual machines to test the code, as described above in connection with FIG. 1.

As further shown in FIG. 4, process 400 may include monitoring execution of the automation script by each virtual machine of the plurality of virtual machines (block 450). For example, the testing platform (e.g., using testing resource 235, processor 320, memory 330, storage component 340, communication interface 370, and/or the like) may monitor execution of the automation script by each virtual machine of the plurality of virtual machines, as described above in connection with FIG. 1.

As further shown in FIG. 4, process 400 may include performing an action associated with the execution of the automation script by each virtual machine of the plurality of virtual machines (block 460). For example, the testing platform (e.g., using testing resource 235, processor 320, memory 330, storage component 340, input component 350, output component 360, communication interface 370, and/or the like) may perform an action associated with the execution of the automation script by each virtual machine of the plurality of virtual machines, as described above in connection with FIG. 1.

Process 400 may include additional implementations, such as any single implementation or any combination of implementations described below and/or in connection with one or more other processes described elsewhere herein.

In some implementations, the automation script may enable a functional testing and/or a performance testing of the code. In some implementations, the number of the plurality of virtual machines may be equal to the number of the plurality of browsers, such that each virtual machine of the plurality of virtual machines hosts one browser of the plurality of browsers. In some implementations, the code may be associated with implementing a financial transaction via an application.

In some implementations, when performing the action, the testing platform may determine whether the code passed or failed a performance test of the automation script based on the execution of the automation script and may indicate that the code passed or failed the performance test. In some implementations, when performing the action, the testing platform may generate a report associated with the execution of the automation script on each of the virtual machines. In some implementations, when performing the action, the testing platform may log a success or failure of functional tests and/or performance tests of the automation script for the execution of the automation script by each of the plurality of browsers.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
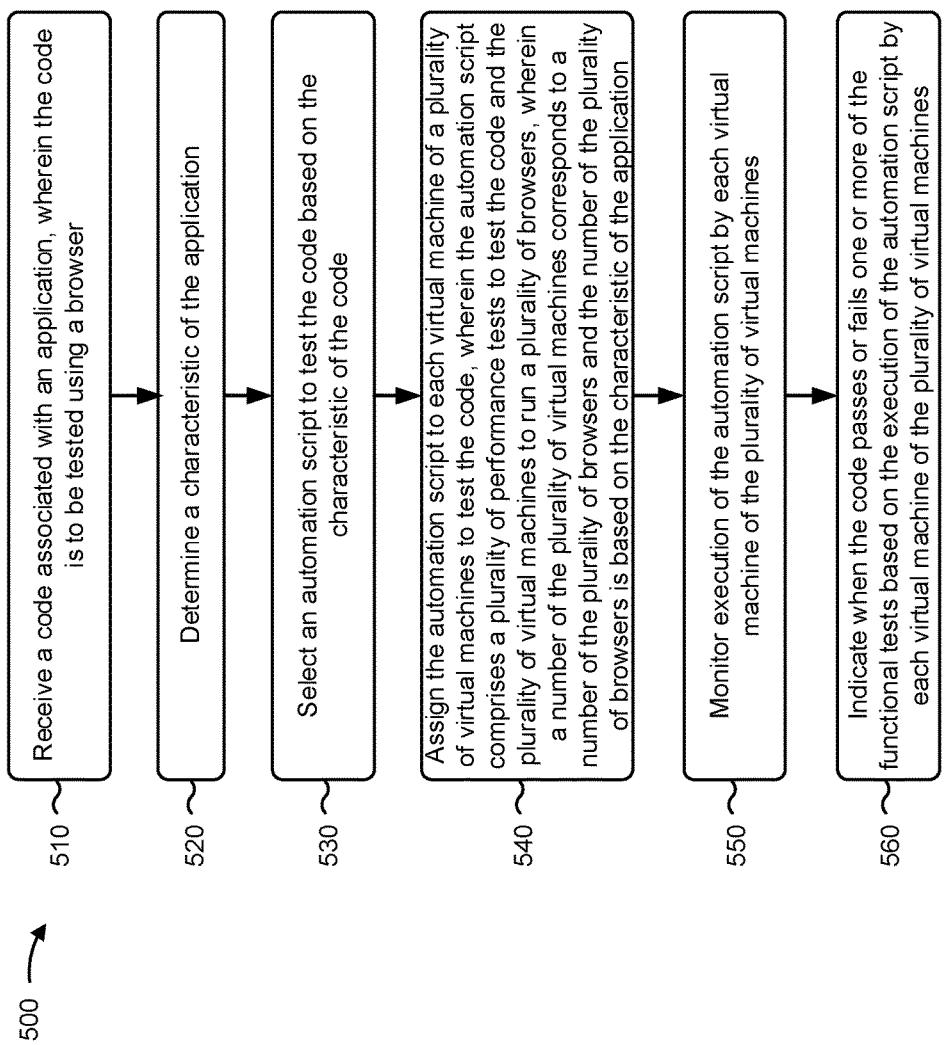
FIG. 5 is a flow chart of an example process associated with user interface based performance testing.

FIG. 5 is a flow chart of an example process 500 associated with user interface (UI) based performance testing. In some implementations, one or more process blocks of FIG. 5 may be performed by a testing platform (e.g., testing platform 230). In some implementations, one or more process blocks of FIG. 5 may be performed by another device or a group of devices separate from or including the testing platform (e.g., testing platform 230), such as a user device (e.g., user device 205) and a testing resource (e.g., testing resource 235).

As shown in FIG. 5, process 500 may include receiving a code associated with an application, wherein the code is to be tested using a browser (block 510). For example, the testing platform (e.g., using testing resource 235, processor 320, memory 330, storage component 340, input component 350, communication interface 370, and/or the like) may receive a code associated with an application, as described above in connection with FIG. 1. In some implementations, the code may be tested using a browser.

As further shown in FIG. 5, process 500 may include determining a characteristic of the application (block 520). For example, the testing platform (e.g., using testing resource 235, processor 320, memory 330, storage component 340, and/or the like) may determine a characteristic of the application, as described above in connection with FIG. 1.

As further shown in FIG. 5, process 500 may include selecting an automation script to test the code based on the characteristic of the code (block 530). For example, the testing platform (e.g., using testing resource 235, processor 320, memory 330, storage component 340, and/or the like) may select an automation script to test the code based on the characteristic of the code, as described above in connection with FIG. 1.

As further shown in FIG. 5, process 500 may include assigning the automation script to each virtual machine of the plurality of virtual machines to test the code, wherein the automation script comprises a plurality of performance tests to test the code and the plurality of virtual machines to run a plurality of browsers, and wherein a number of the plurality of virtual machines corresponds to a number of the plurality of browsers and the number of the plurality of browsers is based on the characteristic of the application (block 540). For example, the testing platform (e.g., using testing resource 235, processor 320, memory 330, storage component 340, and/or the like) may assign the automation script to each virtual machine of the plurality of virtual machines to test the code, as described above in connection with FIG. 1. In some implementations, the automation script may comprise a plurality of performance tests to test the code and the plurality of virtual machines to run a plurality of browsers. In some implementations, a number of the plurality of virtual machines may correspond to a number of the plurality of browsers and the number of the plurality of browsers may be based on the characteristic of the application.

As further shown in FIG. 5, process 500 may include monitoring execution of the automation script by each virtual machine of the plurality of virtual machines (block 550). For example, the testing platform (e.g., using testing resource 235, processor 320, memory 330, storage component 340, communication interface 370, and/or the like) may monitor execution of the automation script by each virtual machine of the plurality of virtual machines, as described above in connection with FIG. 1.

As further shown in FIG. 5, process 500 may include indicating when the code passes or fails one or more of the performance tests based on the execution of the automation script by each virtual machine of the plurality of virtual machines (block 560). For example, the testing platform (e.g., using testing resource 235, processor 320, memory 330, storage component 340, output component 360, communication interface 370, and/or the like) may indicate when the code passes or fails one or more of the performance tests based on the execution of the automation script by each virtual machine of the plurality of virtual machines, as described above in connection with FIG. 1.

Process 500 may include additional implementations, such as any single implementation or any combination of implementations described below and/or in connection with one or more other processes described elsewhere herein.

In some implementations, the characteristic may comprise a number of potential users of the application. In some implementations, when generating the number of the plurality of virtual machines, the testing platform may access a cloud environment hosting the plurality of virtual machines and may assign the plurality of virtual machines to run the plurality of browsers, where each of the plurality of virtual machines runs one of the plurality of browsers.

In some implementations, the application may be associated with providing one or more financial services. In some implementations, the financial services may comprise performing a financial transaction, accessing a banking account service, receiving a financial consultation service, accessing an investment banking service, receiving a transaction card service, performing a deposit transaction, performing a withdrawal transaction, performing a currency transfer, performing a bill payment, accessing a loan service, and/or requesting a cash delivery service.

In some implementations, each of the plurality of browsers may be a same type of browser. In some implementations, when indicating that the code passed or failed, the testing platform may determine whether the code passed or failed one of the plurality of performance tests of the automation script during execution of the automation script and may indicate that the code passed or failed the one of the plurality of performance tests based on determining whether the one of the plurality of performance tests passed or failed.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 associated with user interface (UI) based performance testing. In some implementations, one or more process blocks of FIG. 6 may be performed by a testing platform (e.g., testing platform 230). In some implementations, one or more process blocks of FIG. 6 may be performed by another device or a group of devices separate from or including testing platform (e.g., testing platform 230), such as a user device (e.g., user device 205), and a testing resource (e.g., testing resource 235).

As shown in FIG. 6, process 600 may include receiving a code associated with an application, wherein the code is to be tested using a browser (block 610). For example, the testing platform (e.g., using testing resource 235, processor 320, memory 330, storage component 340, input component 350, communication interface 370, and/or the like) may receive a code associated with an application, as described above in connection with FIG. 1. In some implementations, the code may be tested using a browser.

As further shown in FIG. 6, process 600 may include allocating a number of a plurality of virtual machines to host a plurality of browsers, wherein the number of the plurality of virtual machines corresponds to a number of the plurality of browsers (block 620). For example, the testing platform (e.g., using testing resource 235, processor 320, memory 330, storage component 340, communication interface 370, and/or the like) may allocate a number of a plurality of virtual machines to host a plurality of browsers, as described above in connection with FIG. 1. In some implementations, the number of the plurality of virtual machines may correspond to a number of the plurality of browsers.

As further shown in FIG. 6, process 600 may include selecting a first automation script to test the code based on a characteristic of the code (block 630). For example, the testing platform (e.g., using testing resource 235, processor 320, memory 330, storage component 340, and/or the like) may select a first automation script to test the code based on a characteristic of the code, as described above in connection with FIG. 1.

As further shown in FIG. 6, process 600 may include assigning an automation script to each virtual machine of the plurality of virtual machines to test the code (block 640). For example, the testing platform (e.g., using testing resource 235, processor 320, memory 330, storage component 340, and/or the like) may assign an automation script to each virtual machine of the plurality of virtual machines to test the code.

As further shown in FIG. 6, process 600 may include monitoring execution of the first automation script within each browser of the plurality of browsers running on each of the first set of the plurality of virtual machines, wherein, during execution of the first automation script, each browser of the plurality of browsers running on each of the first set of the plurality of virtual machines uses the first automation script to access a system under test (SUT) (block 650). For example, the testing platform (e.g., using testing resource 235, processor 320, memory 330, storage component 340, communication interface 370, and/or the like) may monitor execution of the first automation script within each browser of the plurality of browsers running on each of the first set of the plurality of virtual machines, as described above in connection with FIG. 1. In some implementations, during execution of the first automation script, each browser of the plurality of browsers running on each of the first set of the plurality of virtual machines may use the first automation script to access a system under test (SUT).

As further shown in FIG. 6, process 600 may include performing an action associated with the execution of the first automation script by each virtual machine of the first set of the plurality of virtual machines (block 660). For example, the testing platform (e.g., using testing resource 235, processor 320, memory 330, storage component 340, input component 350, output component 360, communication interface 370, and/or the like) may perform an action associated with the execution of the first automation script by each virtual machine of the first set of the plurality of virtual machines, as described above in connection with FIG. 1.

Process 600 may include additional implementations, such as any single implementation or any combination of implementations described below and/or in connection with one or more other processes described elsewhere herein.

In some implementations, the first automation script may comprise a first set of performance tests to test performance of the code. In some implementations, the characteristic of the application may comprise a number of users that access the application on average at a particular time.

In some implementations, the testing platform may select a second automation script to test the code based on the characteristic of the code, where the second automation script includes a different set of performance tests than the first automation script, may assign the second automation script to each virtual machine of a second set of the plurality of virtual machines to test the code, may monitor execution of the second automation script within each browser running on each of the second set of the plurality of virtual machines, and may perform an action associated with the execution of the first automation script and second automation script by each virtual machine of the plurality of virtual machines.

In some implementations, the system under test (SUT) may host the application to provide a financial service. In some implementations, when performing the action, the testing platform may determine whether the code passed or failed a performance test of the first automation script based on the execution of the first automation script and may indicate that the code passed or failed the performance test.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, testing platform 230 may conserve processing resources and network resources by enabling reuse of automation scripts for performance testing. For example, for each update to a code associated with SUT 210, testing platform 230 may conserve processing resources associated with creating new or custom automation scripts for performance testing the code and network resources associated with uploading and/or providing the new automation scripts. Furthermore, testing platform 230 can conserve processing resources and network resources associated with performing testing being performed on multiple operating systems, desktops, and/or browsers of multiple devices. For example, testing platform 230 can monitor performance testing via a plurality of virtual machines implemented on a single device and generate a single report that can identify successes or failures of functional tests and/or performance tests of automation scripts executed via browsers hosted by the virtual machines.

The foregoing disclosure provides illustration and description but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a textbased user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, a code for testing,
        wherein the code is to be tested using a browser;
    determining, by the device, a number of a plurality of browsers that are to be used to test the code;
    predicting, by the device, a number of a plurality of virtual machines to host the number of the plurality of browsers,
        the number of the plurality of virtual machines being predicted based on a model trained using historical data;
    generating, by the device, the number of a plurality of virtual machines to host the plurality of browsers,
        wherein the number of the plurality of virtual machines is based on the number of the plurality of browsers and predicting the number of the plurality of virtual machines;
    assigning, by the device, an automation script to each virtual machine of the virtual machines to test the code;
    monitoring, by the device, execution of the automation script by each virtual machine of the plurality of virtual machines; and
    performing, by the device, an action associated with the execution of the automation script by each virtual machine of the plurality of virtual machines.

2. The method of claim 1, wherein the automation script enables at least one of a functional testing or performance testing of the code.

3. The method of claim 1, wherein the number of the plurality of virtual machines is equal to the number of the plurality of browsers, such that each virtual machine of the plurality of virtual machines hosts one browser of the plurality of browsers.

4. The method of claim 1, wherein the code is associated with implementing a financial transaction via an application.

5. The method of claim 1, wherein performing the action comprises:
    determining whether the code passed or failed a performance test of the automation script based on the execution of the automation script; and
    indicating that the code passed or failed the performance test.

6. The method of claim 1, wherein performing the action comprises generating a report associated with the execution of the automation script on each of the virtual machines.

7. The method of claim 1, wherein performing the action comprises logging a success or failure of functional tests and/or performance tests of the automation script for the execution of the automation script by each of the plurality of browsers.

8. A device, comprising:
    one or more memories; and
    one or more processors, communicatively coupled to the one or more memories, to:
        receive a code associated with an application,
            wherein the code is to be tested using a browser;
        determine a characteristic of the application;
        predict a number of a plurality of virtual machines to host a number of a plurality of browsers,
            the number of the plurality of virtual machines being predicted based on a model trained using historical data;
        select an automation script to test the code based on a characteristic of the code;
        assign the automation script to each virtual machine of the plurality of virtual machines to test the code,
            wherein the automation script comprises a plurality of performance tests to test the code and the plurality of virtual machines to run the plurality of browsers,
                wherein a number of the plurality of virtual machines corresponds to a number of the plurality of browsers, and is based on predicting the number of the plurality of virtual machines, and the number of the plurality of browsers is based on the characteristic of the application;
        monitor execution of the automation script by each virtual machine of the plurality of virtual machines; and
        indicate when the code passes or fails one or more of the performance tests based on the execution of the automation script by each virtual machine of the plurality of virtual machines.

9. The device of claim 8, wherein the characteristic of the application comprises a number of potential users of the application.

10. The device of claim 8, wherein the one or more processors, when generating the number of the plurality of virtual machines, are to:
    access a cloud environment hosting the plurality of virtual machines; and
    assign the plurality of virtual machines to run the plurality of browsers,
        wherein each of the plurality of virtual machines runs one of the plurality of browsers.

11. The device of claim 8, wherein the application is associated with providing one or more financial services.

12. The device of claim 11, wherein the financial services comprise at least one of:
    performing a financial transaction;
    accessing a banking account service;
    receiving a financial consultation service;
    accessing an investment banking service;
    receiving a transaction card service;
    performing a deposit transaction;
    performing a withdrawal transaction;
    performing a currency transfer;
    performing a bill payment;
    accessing a loan service; or
    requesting a cash delivery service.

13. The device of claim 8, wherein each of the plurality of browsers are a same type of browser.

14. The device of claim 8, wherein the one or more processors, when indicating that the code passed or failed, are to:
    determine whether the code passed or failed one of the plurality of performance tests of the automation script during execution of the automation script; and
    indicate that the code passed or failed the one of the plurality of performance tests based on determining whether the one of the plurality of performance tests passed or failed.

15. A non-transitory computer-readable medium storing instructions, the instructions comprising:
    one or more instructions that, when executed by one or more processors, cause the one or more processors to:
        receive a code associated with an application,
            wherein the code is to be tested using a browser;
        predict a number of a plurality of virtual machines to host a number of a plurality of browsers,
            the number of the plurality of virtual machines being predicted based on a model trained using historical data;
        allocate a number of a plurality of virtual machines to host a plurality of browsers,
            wherein the number of the plurality of virtual machines corresponds to a number of the plurality of browsers, and is based on predicting the number of the plurality of virtual machines;
        select a first automation script to test the code based on a characteristic of the code;
        assign the first automation script to each virtual machine of a first set of the plurality of virtual machines to test the code;
        monitor execution of the first automation script within each browser of the plurality of browsers running on each of the first set of the plurality of virtual machines,
            wherein, during execution of the first automation script, each browser of the plurality of browsers running on each of the first set of the plurality of virtual machines uses the first automation script to access a system under test (SUT); and
        perform an action associated with the execution of the first automation script by each virtual machine of the first set of the plurality of virtual machines.

16. The non-transitory computer-readable medium of claim 15, wherein the first automation script comprises a first set of performance tests to test performance of the code.

17. The non-transitory computer-readable medium of claim 15, wherein the characteristic of the application comprises a number of users that access the application on average at a particular time.

18. The non-transitory computer-readable medium of claim 15, wherein the one or more instructions further cause the one or more processors to:
    select a second automation script to test the code based on the characteristic of the code,
        wherein the second automation script includes a different set of performance tests than the first automation script;
    assign the second automation script to each virtual machine of a second set of the plurality of virtual machines to test the code;
    monitor execution of the second automation script within each browser running on each of the second set of the plurality of virtual machines; and
    perform an action associated with the execution of the first automation script and second automation script by each virtual machine of the plurality of virtual machines.

19. The non-transitory computer-readable medium of claim 15, wherein the system under test (SUT) hosts the application to provide a financial service.

20. The non-transitory computer-readable medium of claim 15, wherein the one or more instructions, that cause the one or more processors to perform the action, cause the one or more processors to:
    determine whether the code passed or failed a performance test of the first automation script based on the execution of the first automation script; and
    indicate that the code passed or failed the performance test.

* * * * *